(12) United States Patent
Stoutamire

(10) Patent No.: US 7,299,318 B2
(45) Date of Patent: Nov. 20, 2007

(54) METHOD FOR REDUCING CACHE CONFLICT MISSES

(75) Inventor: David P. Stoutamire, San Juan Bautista, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 457 days.

(21) Appl. No.: 10/117,020

(22) Filed: Apr. 4, 2002

(65) Prior Publication Data

US 2003/0120866 A1 Jun. 26, 2003

Related U.S. Application Data

(60) Provisional application No. 60/343,057, filed on Dec. 20, 2001.

(51) Int. Cl.
*G06F 12/00* (2006.01)
*G06F 12/08* (2006.01)
*G06F 12/16* (2006.01)

(52) U.S. Cl. .................... 711/118; 711/170; 711/171; 711/172

(58) Field of Classification Search ............. 711/118, 711/170, 171, 172
See application file for complete search history.

(56) References Cited

U.S. PATENT DOCUMENTS 5,649,143 A * 7/1997 Parady ..................... 711/220
6,006,312 A * 12/1999 Kohn et al. ............... 711/210
2002/0118206 A1 * 8/2002 Knittel ...................... 345/557

* cited by examiner

*Primary Examiner*—Sanjiv Shah
*Assistant Examiner*—Midys Rojas
(74) *Attorney, Agent, or Firm*—Martine Penilla & Gencarella LLP

(57) ABSTRACT

An invention is provided for reducing cache conflict misses via specific placement of non-split functions and data objects in main memory based on cache size. A cache size of a computer cache memory is determined, and a first data block is placed within a main computer memory. The first data block includes a first sub-block that will be frequently referenced. In addition, the first sub-block ends at a first ending address. A second data block is then placed within the main computer memory. The second data block includes a second sub-block that will be frequently referenced, and is placed such that the second sub-block will be contiguous with the first sub-block in the computer cache memory during execution.

19 Claims, 9 Drawing Sheets

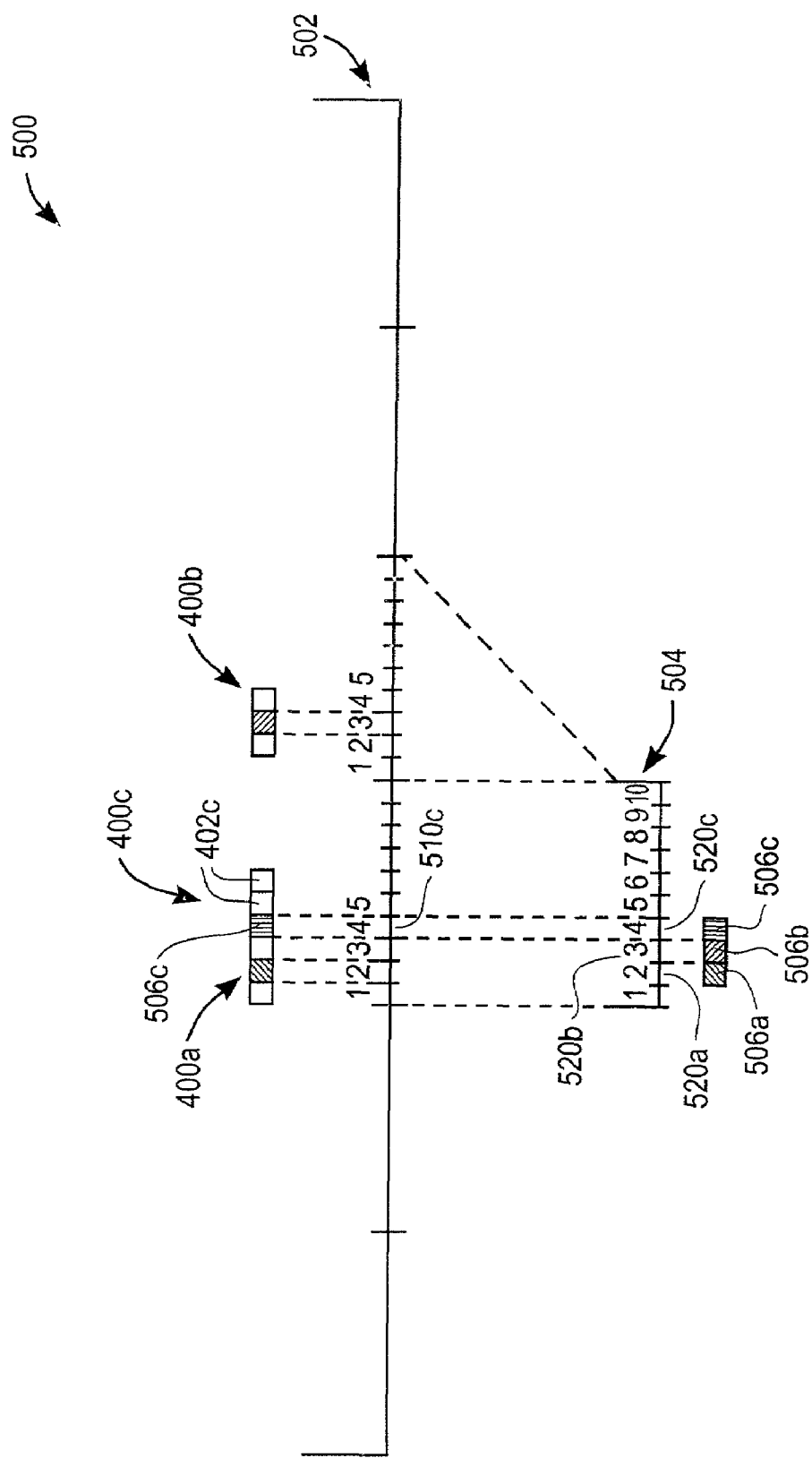

METHOD FOR REDUCING CACHE CONFLICT MISSES

CROSS REFERENCE TO RELATED APPLICATIONS

This application claims the benefit of U.S. Provisional Patent Application having ser. No. 60/343,057, filed on Dec. 20, 2001, and entitled "Method for Reducing Cache Conflict Misses," which is incorporated herein by reference.

BACKGROUND OF THE INVENTION

1. Field of the Invention

This invention relates generally to computer memory, and more particularly to methods for reducing conflict misses within computer cache memory during program execution.

2. Description of the Related Art

Today, the speed with which a processor can access data often is critical to its performance. Unfortunately, computer architectures often rely on a mix of fast, less dense, memory and slower bulk memory. Many computer architectures have a multilevel memory architecture in which an attempt is made to find information in the fastest memory. If the information is not in that memory, a check is made at the next fastest memory. This process continues down through the memory hierarchy until the information sought is found. One critical component in such a memory hierarchy is a cache memory.

Cache memory is a type of rapidly accessible memory that is used between a processing device and main memory. FIG. 1 is a block diagram showing a conventional computer system 100. The computer system 100 includes a main memory 102 in communication with a central processing unit (CPU) 104. Located between the main memory 102 and the CPU 104, is a cache memory 106, which is usually constructed from higher speed memory devices such as static random access memory (SRAM). In operation, when a portion of data residing in the main memory 102 is accessed, a copy of the portion of data is placed into the cache memory 106 to increase the speed at which this data is accessed.

Cache memories rely on the principle of locality to attempt to increase the likelihood that a processor will find the information it is looking for in the cache memory. To this end, cache memories typically store contiguous blocks of data. In addition, the cache memory stores a tag that is compared to an address to determine whether the information the processor is seeking is present in the cache memory. Finally, the cache memory may contain status or error correcting codes (ECC).

The effectiveness of the cache memory 106 depends on the way a compiler or runtime system arranges the data structures and instructions in the main memory 102. For example, cache memories 106 are ineffective when placement of data or instructions causes "conflict misses," which can often be overcome by placing data at addresses that will be more favorable for the cache memory 106. Thus, the location of the data within the main memory 104 generally is more important than what is done with the data. Thus, the placement of data within main memory 102 is important because of the interaction between the order of the data in main memory 102 and the order in which the computer hardware chooses to fetch the data into the cache memory 106. As a result, methods have been conventionally used that cluster data together that is frequently accessed.

FIG. 2 is a block diagram showing a group of data 200. The group of data 200 can represent computer functions, which are collections of basic building blocks of computer instructions, or computer objects, which are collections of fields of data. For purposes of illustration, FIG. 2 will be described in terms of computer functions. The group of data 200 illustrated in FIG. 2 includes three functions 201, 202, and 203, each having a plurality of basic building blocks 206a-i. Since it is known that the computer hardware will fetch data that is located together, a number of methods have been used to arrange data more favorable for the cache memory, as discussed next with reference to FIGS. 3A-3C.

FIG. 3A is a block diagram showing the group of data 200 having the functions rearranged in an attempt to improve cache performance. The group of data 200 shown in FIG. 3A has been rearranged such that function 202 and function 203 swap places. For example, functions 201 and 203 may be frequently accessed together. In this case, a compiler or runtime system may place functions 201 and 203 contiguously in main memory in an attempt to improve cache performance.

FIG. 3B is a block diagram showing the group of data 200 having the basic blocks of the functions rearranged in an attempt to improve cache performance. The group of data 200 shown in FIG. 3A has been rearranged such that particular basic blocks of each function change places. For example, basic block A 206a and basic block B 206b of function 201 can change places. For example, basic block A 206a and basic block C 206c of function 201 may be frequently accessed together. In this case, a compiler or runtime system may place basic block A 206a and basic block C 206c contiguously in main memory in an attempt to improve cache performance.

FIG. 3C is a block diagram showing the group of data 200 having the basic blocks of the functions split in an attempt to improve cache performance. By splitting the functions as shown in FIG. 3C, a compiler or runtime system actually changes the representation of the functions. In the example of FIG. 3C, a system determines which basic blocks are frequently accessed, also known as "hot," and which basic blocks are infrequently accessed, also know as "cold." For example, in FIG. 3C basic blocks A 206a, D 206d, and G 206g are "hot," while basic blocks B 206b, C 206c, E 206e, F 206f, G 206g, and I 206i are "cold."

In the method of FIG. 3C, the compiler or runtime system splits the hot basic blocks from the cold basic blocks and connects them together using a pointer 302. For example, the compiler or runtime system stores a pointer 302 with basic block A 206a that points to the area of memory storing basic blocks B 206b and C 206c. As a result, hot basic blocks A 206a, D 206d, and G 206g can be placed closer together in memory, while the cold basic blocks B 206b, C 206c, E 206e, F 206f, G 206g, and I 206i can be stored separately.

Unfortunately, there are several drawbacks to splitting as shown in FIG. 3C. First, many instruction sets penalize branches between basic blocks that are far away from each other. In particular, branches between basic blocks normally are represented with a program counter offset of a fixed number of bits. However, the pointers used for splitting may require more bits to represent and require extra overhead. Second, for systems such as a Java Virtual Machine, there may be additional data associated with each function for debugging, pointer-locating, and inline caching. This data generally is more efficiently accessed when kept close to the code. In the case of data objects, splitting introduces additional overhead such as extra fields to link the hot and cold fields, which slows cold field lookups and requires increased memory management. In view of the foregoing, there is a need systems and methods that improve cache performance without introducing the extra overhead associated with splitting. The methods should allow data to be placed efficiently into cache memory and reduce conflict misses.

SUMMARY OF THE INVENTION

Broadly speaking, the present invention fills these needs by providing a memory loading mechanism for reducing cache conflict misses via specific placement of non-split functions and data objects in main memory based on cache size. In one embodiment, a method is disclosed for reducing computer cache conflict misses. A cache size of a computer cache memory is determined, and a first data block is placed within a main computer memory. The first data block includes a first sub-block that will be frequently referenced. In addition, the first sub-block ends at a first ending address. Next, a second data block is placed within the main computer memory. The second data block includes a second sub-block that will be frequently referenced, and is placed such that the second sub-block will be contiguous with the first sub-block in the computer cache memory during execution. Generally, neither the first data block nor the second data block is split in the main computer memory.

In loading the second data block, the second data block can be placed in the main memory such that the second sub-block is located at a main memory address that is a multiple of the cache size from the first ending address. The method can continue by loading a third data block, which includes a third sub-block that will be frequently referenced. The third data block can then be placed such that the third sub-block will be contiguous with the first sub-block and the second sub-block in the computer cache memory during execution. Similar to the second sub-block, the third data block can be placed such that the third sub-block is located at a main memory address that is a multiple of the cache size from an ending address of the second sub-block.

In another embodiment, a computer program embodied on a computer readable medium is disclosed for reducing computer cache conflict misses. The computer program includes a code segment that places a first data block within a main computer memory, wherein the first data block includes a first sub-block that will be frequently referenced, and wherein the first sub-block ends at a first ending address. In addition, the computer program includes a code segment that places a second data block within the main computer memory. As above, the second data block includes a second sub-block that will be frequently referenced. The code segment places the second data block such that the second sub-block is located at a main memory address that is a multiple of a cache size of computer cache from the first ending address. Optionally, the computer program can include a code segment that determines which sub-blocks of a data block will be frequently accessed, and a code segment that determines the cache size. As above, generally neither the first data block nor the second data block is split in main memory.

A further method for reducing computer cache conflict misses is disclosed in another embodiment of the present invention. A cache size of a computer cache memory is determined, and a first data block is placed within a main computer memory. As above, the first data block includes a first sub-block that will be frequently referenced, and ends at a first ending address. Next, a second data block is placed within the main computer memory, where the second data block includes a second sub-block that will be frequently referenced. To reduce cache conflict misses, the second data block is placed such that the second sub-block is located at a main memory address that is a multiple of the cache size from the first ending address. In one aspect, each data block can be a data object, and each sub-block can be a field. In this aspect, a third data object can be placed within the main computer memory, where the third data object includes a third field that will be frequently referenced. The third data object can be placed such that the third field is located at a main memory address that is a multiple of the cache size from the first ending address. In another aspect, each data block can be a function, and each sub-block can be a basic block. In this aspect, a third function can be placed within the main computer memory, where the third function includes a third basic block that will be frequently referenced. Similar to the data object, the third function can be placed such that the third basic block is located at an main memory address that is a multiple of the cache size from the first ending address. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which:

FIG. 5C is a diagram showing the computer memory system having a third data block stored to allow contiguous storage of the hot sub-blocks in cache memory, in accordance with an embodiment of the present invention;

DETAILED DESCRIPTION OF THE PREFERRED EMBODIMENTS

An invention is disclosed for reducing cache conflict misses via specific placement of non-split functions and data objects in main memory. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
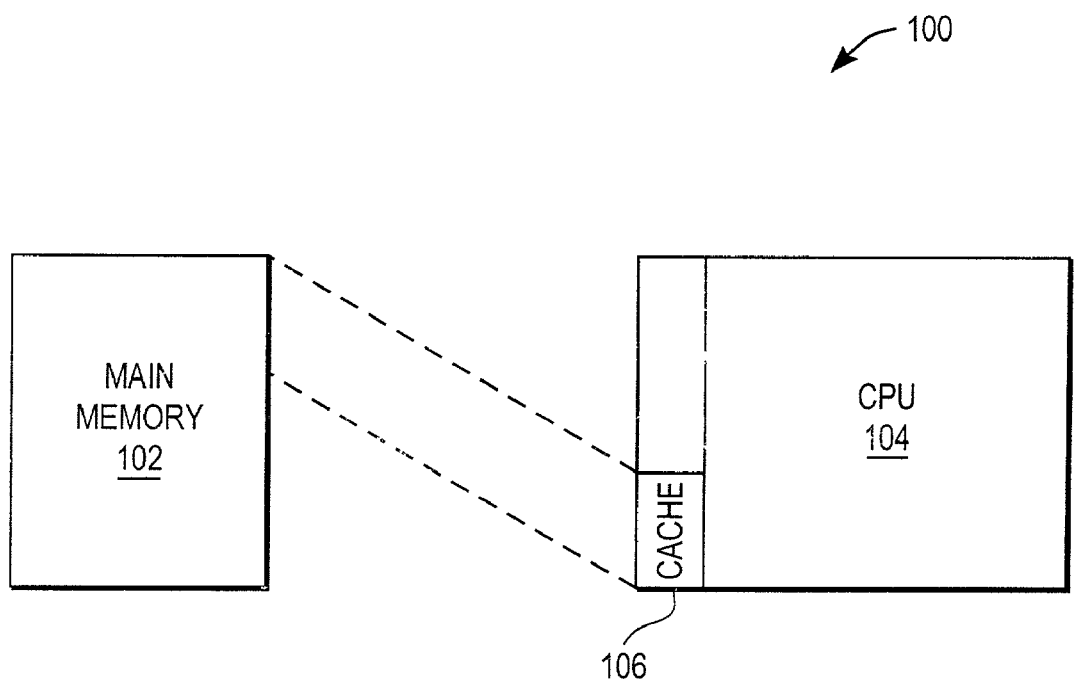
FIG. 1 is a block diagram showing a conventional computer system.
Figure 2:
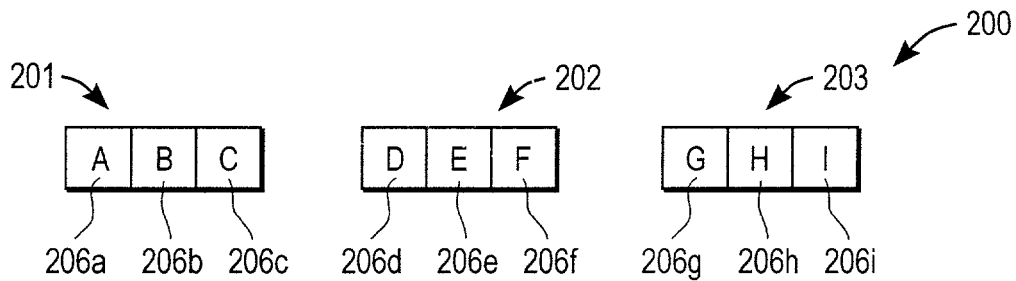
FIG. 2 is a block diagram showing a group of data.
Figure 3A:
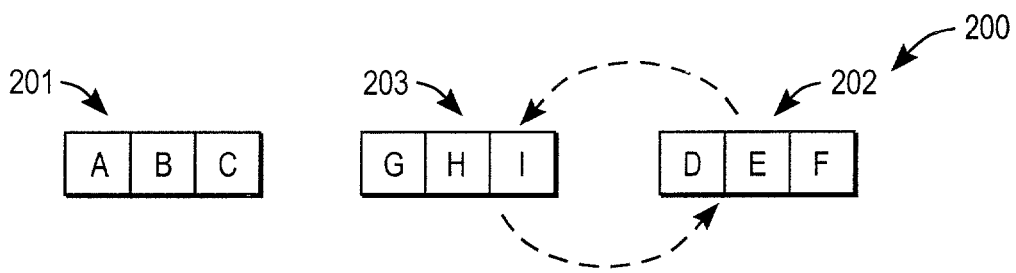
FIG. 3A is a block diagram showing the group of data having the functions rearranged in an attempt to improve cache performance.
Figure 3B:
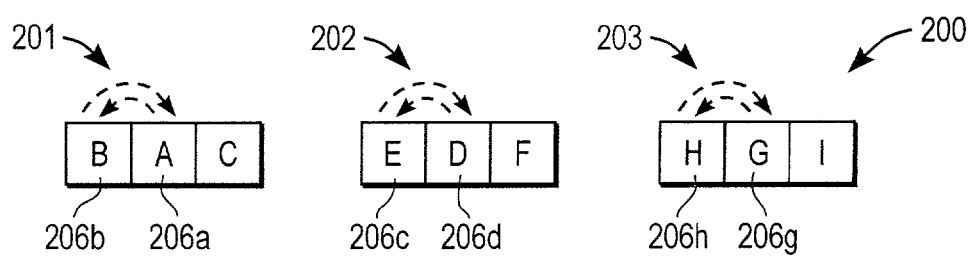
FIG. 3B is a block diagram showing the group of data having the basic blocks of the functions rearranged in an attempt to improve cache performance.
Figure 3C:
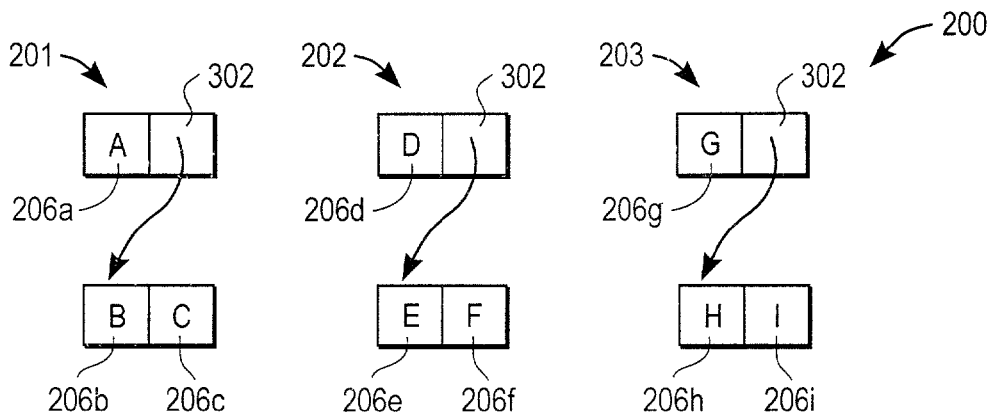
FIG. 3C is a block diagram showing the group of data having the basic blocks of the functions split in an attempt to improve cache performance.
Figure 4A:
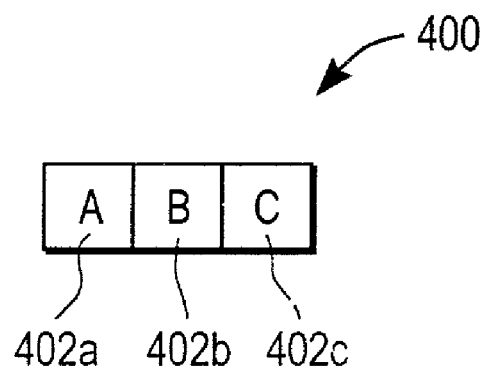
FIG. 4A is a block diagram showing an exemplary data block having a plurality of sub-blocks.

FIGS. 1-3C were described in terms of the prior art. FIG. 4A is a block diagram showing an exemplary data block 400 having a plurality of sub-blocks 402a-402c. A computer program is comprised of a plurality of data blocks 400, which can be either data objects or functions. A data block 400 that represents a data object includes a plurality of fields, represented by the sub-blocks 402a-402c in FIG. 4A. Conversely, a data block 400 that represents a function comprises a plurality of basic blocks, represented by the sub-blocks 402a-402c. Each basic block 402a comprises a set of computer instructions, as discussed next with reference to FIG. 4B.

Figure 4B:
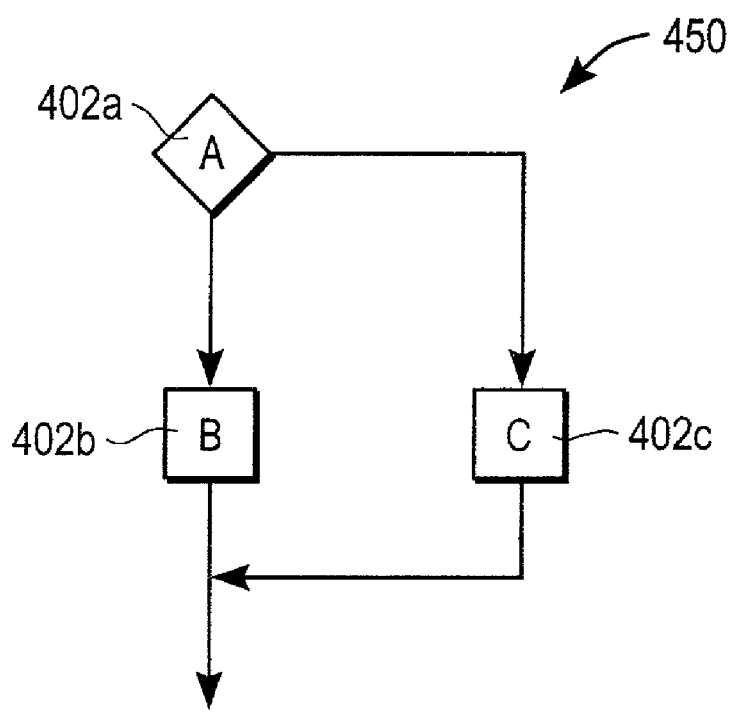
FIG. 4B is a flow diagram showing an exemplary function representing the function stored in the data block of FIG. 4A.

FIG. 4B is a flow diagram showing an exemplary function 450 representing the function stored in the data block 400 of FIG. 4A. As shown in FIG. 4B, the basic blocks 402a-402c of a function interact with each other. For example, basic block A 402a can call either basic block B 402b or C 402c in FIG. 4B. Referring back to FIG. 4A, a data block 400 is used to describe either a function or a data object. Thus, in the following description, the term data block will be used as synonymous with data object and function. In particular, it should noted that the reference to a data block is intended to merely refer to any type of associated data that is stored in memory, such as a function or data object. Similarly, the term sub-block will be used as synonymous with field and basic block. In particular, it should noted that the reference to a sub-block is intended to merely refer to any type of data that is part of a data block, such as a field or basic block.

Broadly speaking, embodiments of the present invention enhance cache performance by arranging data blocks 400 in main memory such that frequently accessed sub-blocks 402 are contiguously arranged in cache memory. As will be apparent to those skilled in the art, there exist a plurality of techniques to determine which sub-blocks are frequently accessed, or "hot," and which sub-blocks are infrequently accessed, or "cold," for example, the techniques of profiling, instrumentation, and compiler heuristics can be employed. When arranging data blocks 400, embodiments of the present invention reduce cache conflict misses by clustering the hot sub-blocks of data blocks with respect to cache line placement instead of with respect to main memory addresses.

Figure 4C:
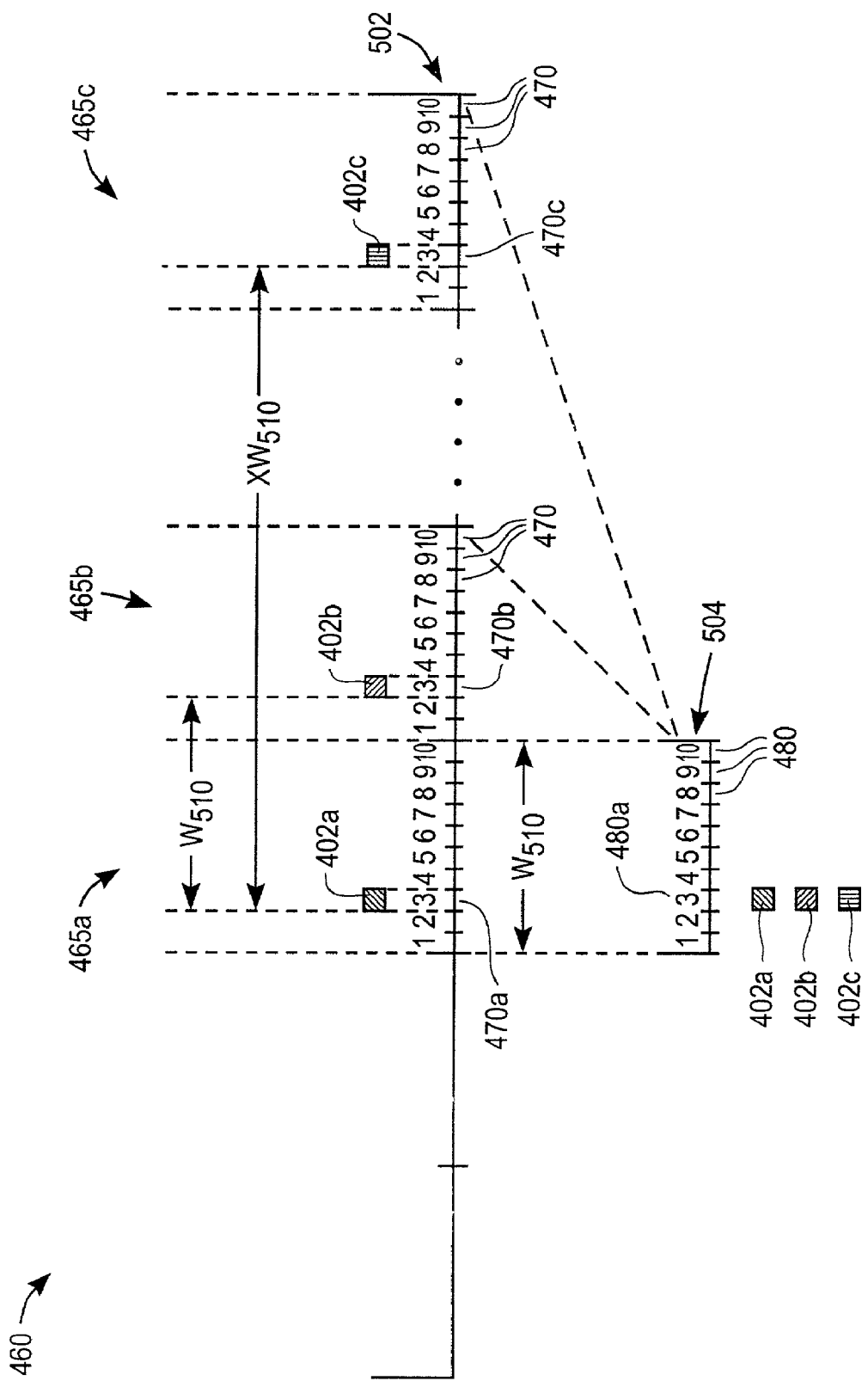
FIG. 4C is a diagram showing a computer memory system, in accordance with an embodiment of the present invention.

FIG. 4C is a diagram showing a computer memory system 460, in accordance with an alternate embodiment of the present invention. The computer memory system 460 includes a main memory 502 and a cache memory 504 of a particular cache size $W_{510}$ bytes, for example 64K bytes. As previously mentioned, cache memories 504 rely on the principle of locality to increase the likelihood that a processor will find the information it is looking for in the cache memory 504. Hence, when a portion of data residing in the main memory 502 is accessed, a copy of the portion of data is placed into the cache memory 504 to increase the speed at which this data can be accessed thereafter.

Generally, each location in the main memory 502 maps to a fixed location in the cache memory 504. For example, memory regions 465a, 465b, and 465c each represent regions of main memory 502 that occupy the same footprint as the cache memory 504. Each memory regions 465a, 465b, and 465c is further divided into sub-regions 470. Whenever data from one of the sub-regions 470 is copied to the cache memory 504, the data is mapped to a corresponding cache sub-region 480 within the cache memory 504.

Hence, sub-regions 470 in the main memory 502 are typically forced to share cache sub-regions 480 within the cache memory 504. For example, sub-block 402a is stored within the main memory 502 at a particular location 470a. When sub-block 402a is copied into the cache memory 504, the sub-block 402a will occupy a sub-region 480a within the cache memory 504. If another sub-block 402b is stored in the main memory 502 at an address offset from sub-block 402a equal to the cache size $W_{510}$ bytes, sub-block 402b will occupy the same sub-region 480a in the cache memory 504 as occupied by sub-block 402a, thus overwriting sub-block 402a in cache memory 504. Similarly, if a further sub-block 402c is stored in the main memory 502 at an address offset from sub-block 402a equal to a multiple of the cache size $XW_{510}$, sub-block 402c will also occupy the same sub-region 480a in the cache memory 504 as occupied by sub-block 402a and 402b. As can be seen, FIG. 4C defines a structure that illustrates a problem with prior art depicted by the overwriting of sub-blocks 402a and 402b by sub-block 402c.

Figure 5A:
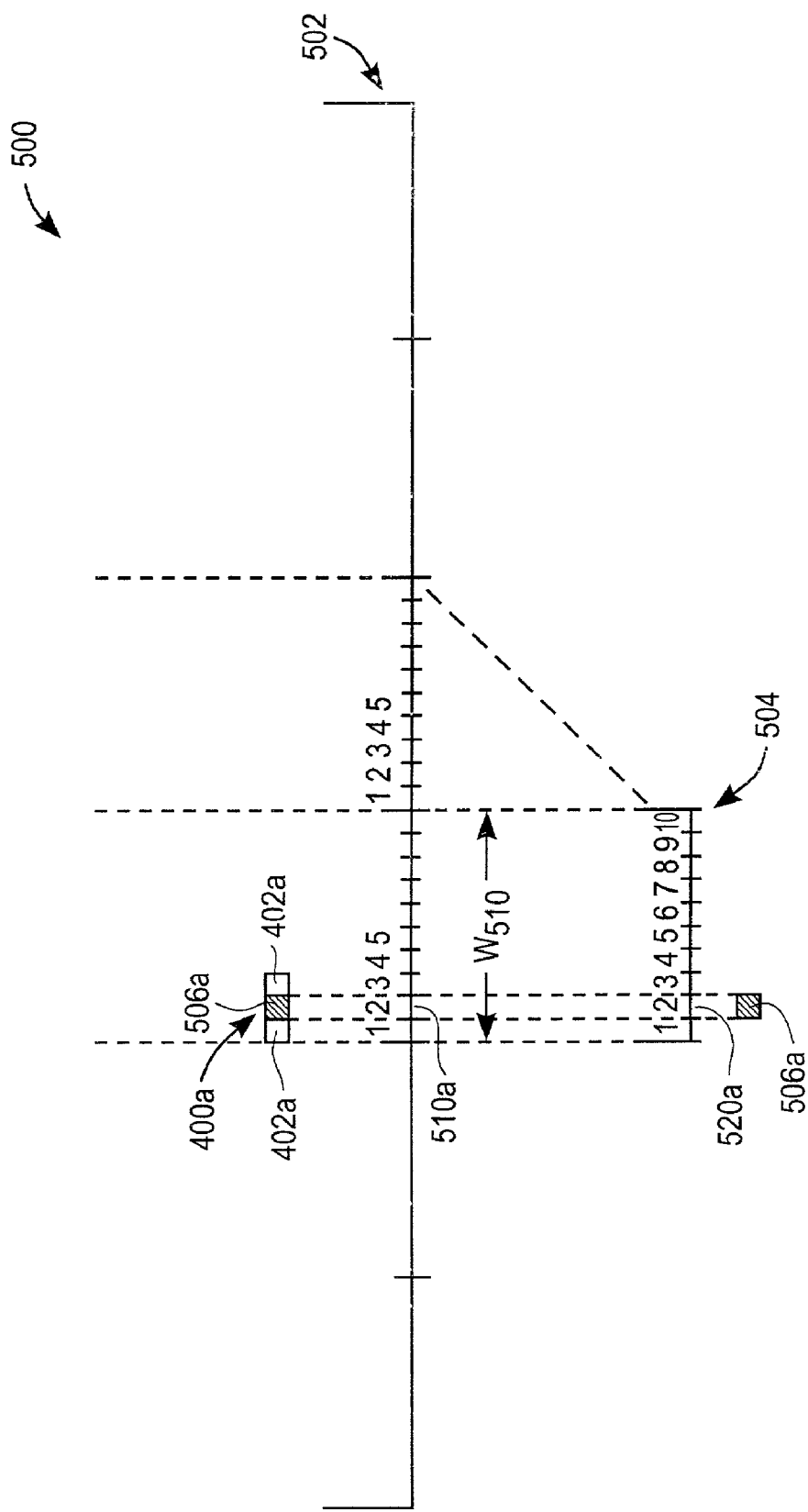
FIG. 5A is a diagram showing a computer memory system, in accordance with an embodiment of the present invention.

Embodiments of the present invention utilize the above-described properties of cache memory to arrange the hot sub-blocks of data blocks contiguously within cache memory, as discussed next with reference to FIGS. 5A-5C. FIG. 5A is a diagram showing a computer memory system 500, in accordance with an embodiment of the present invention. As above, the computer memory system 500 includes a main memory 502 and a cache memory 504 having a cache size of $W_{510}$ bytes. In the example of FIG. 5A, a data block 400a having cold sub-blocks 402a and a hot sub-block 506a is stored in the main memory 502. In particular, the hot sub-block 506a of the data block 400a is stored at an address 510a in the main memory, and will occupy address 520a in cache memory 504 when accessed and stored in the cache memory 504.

Since, the cold sub-blocks 402a are infrequently accessed, they will also be infrequently copied to the cache memory 504. In contrast, the hot sub-block 506a is frequently accessed, and thus is desirable to have in cache memory 504 during execution. As a result, embodiments of the present invention store data blocks in main memory 502 based on the address of the hot sub-blocks in memory, rather than the address of the entire data block in memory. More particularly, embodiments of the present invention cluster the hot sub-blocks of data blocks with respect to cache line placement instead of with respect to main memory addresses.

The embodiments of the present invention store data blocks in main memory 502 such that the hot sub-blocks will be contiguously stored in the cache memory 504 when accessed and stored in cache memory 504. Thus, if a data block cannot be placed contiguously in main memory 502 to allow contiguous cache memory 504 storage of the hot sub-blocks, embodiments of the present invention offset the data block in main memory based on the cache size $W_{510}$, as shown next in FIG. 5B.

Figure 5B:
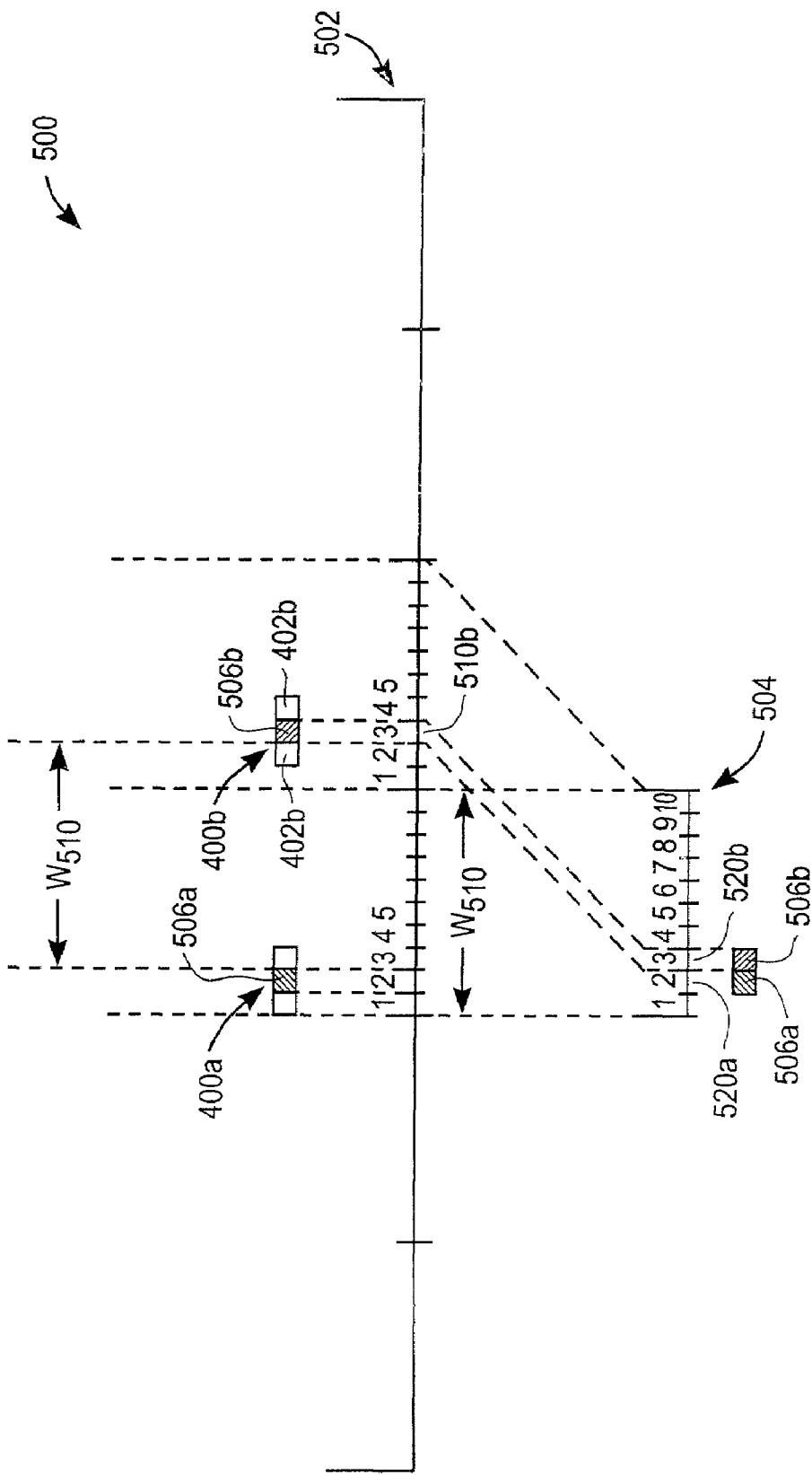
FIG. 5B is a diagram showing the computer memory system having a second data block stored with respect to cache line placement, in accordance with an embodiment of the present invention.

FIG. 5B is a diagram showing the computer memory system 500 having a second data block 400b stored with respect to cache line placement, in accordance with an embodiment of the present invention. In the example of FIG. 5B, the data block 400b having cold sub-blocks 402b and a hot sub-block 506b is to be stored in the main memory 502. As can be seen, in the example of FIG. 5B the hot sub-block 506b of the data block 400b will not be stored contiguously in cache memory 504 if the data block 400b is stored next to the data block 400a in the main memory 502.

Hence, the embodiments of the present invention store the data block 400b such that the address 510b of the hot sub-block 506b is offset cache size $W_{510}$ bytes from the ending address of the hot sub-block 506a of data block 400a. As a result, the hot sub-block 506b of data block 400b will occupy an address 520b within the cache memory 504 that is contiguous to the hot block 506a, which is stored at address 520a, when accessed and copied to cache memory 504.

FIG. 5C is a diagram showing the computer memory system 500 having a third data block 400c stored to allow contiguous storage of the hot sub-blocks in cache memory, in accordance with an embodiment of the present invention. In the example of FIG. 5C, the data block 400c having cold sub-blocks 402c and a hot sub-block 506c is to be stored in the main memory 502. Here, the hot sub-block 506c of the data block 400c can be stored in the main memory 502 contiguous with the data block 400a while allowing contiguous storage of the hot sub-blocks in the cache memory 504. Thus, data block 400c is stored in the main memory 502 contiguous with the data block 400a. The hot sub-block 506c is stored at an address 510c in the main memory 502, resulting in storage at address 520c, which is contiguous with hot sub-block 506b, in the cache memory 504 when accessed and stored in the cache memory 504. In this manner, the embodiments of the present invention allow storage of data blocks in main memory resulting in efficient cache usage while avoiding splitting of the data blocks and the resulting extra overhead caused by splitting.

Figure 6:
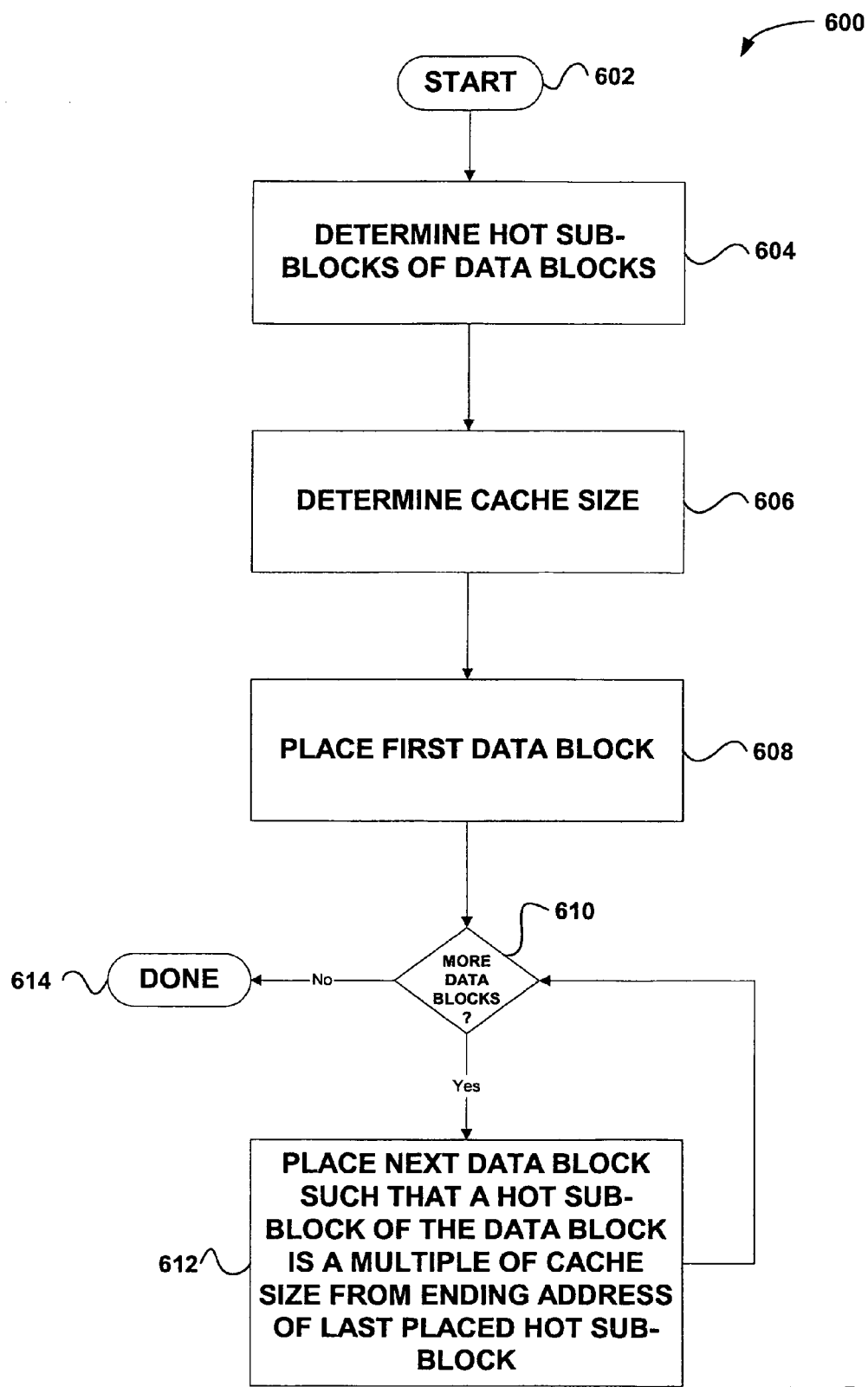
FIG. 6 is a flowchart showing a method for reducing cache conflict misses, in accordance with an embodiment of the present invention.

FIG. 6 is a flowchart showing a method 600 for reducing cache conflict misses, in accordance with an embodiment of the present invention. In an initial operation 602, preprocess operations are performed. Preprocess operations include program development, system provisioning, and other preprocess operations that will be apparent to those skilled in the art.

In operation 604, the hot sub-blocks of the data blocks comprising the program being loaded into memory are determined. As will be apparent to those skilled in the art, there exist a plurality of techniques to determine which sub-blocks are frequently accessed, or "hot," and which sub-blocks are infrequently accessed, or "cold," for example, profiling, instrumentation, and compiler heuristics.

The cache size is determined in operation 606. The cache size can be determined through manual system analysis, polling, or other techniques as will be apparent to those skilled in the art. As mentioned previously, the embodiments of the present invention utilize the cache size for placement of data blocks in main memory. In particular, embodiments of the present invention reduce cache conflict misses by clustering the hot sub-blocks of data blocks with respect to cache line placement instead of with respect to main memory addresses. The first data block is then placed in main memory, in operation 608. The placement location of the first data block can be determined using any heuristic used in memory allocation software.

A decision is then made as to whether additional data blocks remain to be allocated to memory, in operation 610. If additional data blocks remain to be allocated to memory, the method 600 continues with operation 612. Otherwise, the method 600 ends with post process operation 614.

In operation 612, the next data block is placed such that the hot sub-block of the data block is offset a multiple of the cache size in bytes from the ending address of the last placed hot sub-block of the last placed data block. Embodiments of the present invention utilize the properties of cache memory to arrange the hot sub-blocks of data blocks contiguously within cache memory. The hot sub-blocks are frequently accessed, and thus are desirable to have in cache memory during execution. As a result, embodiments of the present invention store data blocks in main memory based on the address of the hot sub-blocks in memory, rather than the address of the entire data block in memory. More particularly, embodiments of the present invention cluster the hot sub-blocks of data blocks with respect to cache line placement instead of with respect to main memory addresses.

The embodiments of the present invention store data blocks in main memory such that the hot sub-blocks will be contiguously stored in the cache memory when accessed and stored in cache memory. Thus, if a data block cannot be placed contiguously in main memory to allow contiguous cache memory storage of the hot sub-blocks, embodiments of the present invention offset the data block in main memory based on the cache size.

More particularly, the embodiments of the present invention store the data blocks such that the address of a hot sub-block is offset cache size bytes from the ending address of the last placed hot sub-block of the last placed data block. As a result, the hot sub-block of a subsequent data block will occupy an address within the cache memory that is contiguous to the hot block of a previous data block when accessed and copied to cache memory.

As previously mentioned, if the hot sub-block 506c of a data block can be stored in the main memory contiguous with another data block while allowing contiguous storage of the hot sub-blocks in the cache memory then it can be stored as such. In this manner, the embodiments of the present invention allow storage of data blocks in main memory resulting in efficient cache usage while avoiding splitting of the data blocks and the resulting extra overhead caused by splitting. Post process operations are performed in operation 614. Post process operations include executing the computer program, further disk access, and other post process operations that will be apparent to those skilled in the art.

Although a particular example of reducing conflict misses has been presented, it should be noted that embodiments of the present invention can reduce conflict misses using additional techniques. For example, in a system where objects are both allocated and deallocated, the deallocation of objects can leave a "hole" in the cache memory that can be usefully filled by a subsequent allocation using the embodiments of the present invention. In addition, memory often is organized into multiple levels, denoted for example, as L1, L2, L3, and Main. Each level typically includes its own size cache and often has different block sizes and conflict resolution polices. As such, although the embodiments of the present invention have been described in terms of a two level memory architecture, it should be noted that the embodiments of the present invention can be applied to any level of memory and generally to multiple levels at once. For example, a placement can be chosen that places the hot block in less conflicted blocks of both L1 and L2 simultaneously.

Embodiments of the present invention may employ various computer-implemented operations involving data stored in computer systems to drive computer software, including application programs, operating system programs, peripheral device drivers, etc. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 7:
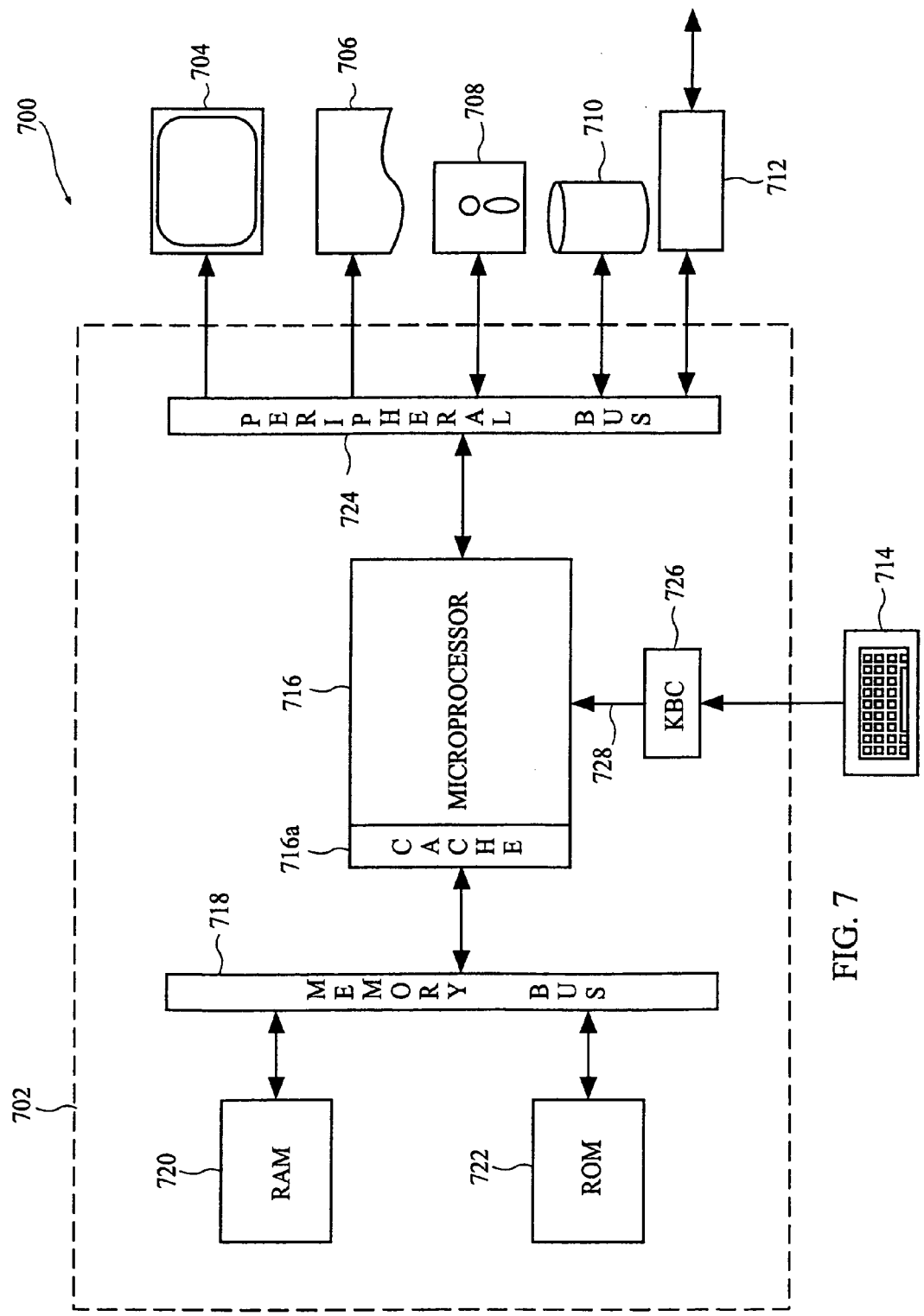
FIG. 7 is a block diagram of an exemplary computer system for carrying out the processing according to the invention.

FIG. 7 is a block diagram of an exemplary computer system 700 for carrying out the processing according to the invention. The computer system 700 includes a digital computer 702, a display screen (or monitor) 704, a printer 706, a floppy disk drive 708, a hard disk drive 710, a network interface 712, and a keyboard 714. The digital computer 702 includes a microprocessor 716, a memory bus 718, random access memory (RAM) 720, read only memory (ROM) 722, a peripheral bus 724, and a keyboard controller (KBC) 726. The digital computer 702 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 716 is a general purpose digital processor which controls the operation of the computer system 700. The microprocessor 716 can be a single-chip processor or can be implemented with multiple components. Using instructions retrieved from memory, the microprocessor 716 controls the reception and manipulation of input data and the output and display of data on output devices. According to the invention, a particular function of microprocessor 716 is to assist in loading of program data blocks into cache memory 716a. As discussed above, the cache memory 716a is a type of rapidly accessible memory that is used between the microprocessor 716 and the RAM 720. Cache memories rely on the principle of locality to attempt to increase the likelihood that a processor will find the information it is looking for in the cache memory. To this end, cache memories store contiguous hot sub-blocks as described above.

The memory bus 718 is used by the microprocessor 716 to access the RAM 720 and the ROM 722. The RAM 720 is used by the microprocessor 716 as a general storage area and as scratch-pad memory, and can also be used to store input data and processed data. The ROM 722 can be used to store instructions or program code followed by the microprocessor 716 as well as other data.

The peripheral bus 724 is used to access the input, output, and storage devices used by the digital computer 702. In the described embodiment, these devices include the display screen 704, the printer device 706, the floppy disk drive 708, the hard disk drive 710, and the network interface 712. The keyboard controller 726 is used to receive input from keyboard 714 and send decoded symbols for each pressed key to microprocessor 716 over bus 728.

The display screen 704 is an output device that displays images of data provided by the microprocessor 716 via the peripheral bus 724 or provided by other components in the computer system 700. The printer device 706, when operating as a printer, provides an image on a sheet of paper or a similar surface. Other output devices such as a plotter, typesetter, etc. can be used in place of, or in addition to, the printer device 706.

The floppy disk drive 708 and the hard disk drive 710 can be used to store various types of data. The floppy disk drive 708 facilitates transporting such data to other computer systems, and hard disk drive 710 permits fast access to large amounts of stored data.

The microprocessor 716 together with an operating system operate to execute computer code and produce and use data. The computer code and data may reside on the RAM 720, the ROM 722, or the hard disk drive 710. The computer code and data could also reside on a removable program medium and loaded or installed onto the computer system 700 when needed. Removable program media include, for example, CD-ROM, PC-CARD, floppy disk and magnetic tape.

The network interface 712 is used to send and receive data over a network connected to other computer systems. An interface card or similar device and appropriate software implemented by the microprocessor 716 can be used to connect the computer system 700 to an existing network and transfer data according to standard protocols.

The keyboard 714 is used by a user to input commands and other instructions to the computer system 700. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory (ROM), random-access memory (RAM), CD-ROMs, magnetic tape, and optical data storage devices. The computer readable medium can also be distributed over a network that couples computer systems so that the computer readable code is stored and executed in a distributed fashion.

Furthermore, the same or similar methods and apparatuses described above for programming a hardware device can also be used for performing other particular maintenance operations on the hardware device. For example, operations such as erasing a ROM, reading a ROM, or performing a checksum on a ROM can be performed. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for reducing computer cache conflict misses, comprising the operations of:
   determining a cache size of a computer cache memory;
   placing a first data block within a main computer memory, the first data block occupying a contiguous portion of the main computer memory, wherein the first data block includes a first sub-block that will be frequently referenced, and wherein the first sub-block ends at a first ending address; and
   placing a second data block within the main computer memory, the second data block including a second sub-block that will be frequently referenced, the second data block occupying a contiguous portion of the main computer memory, wherein the second data block is placed such that the second sub-block will be contiguous with the first sub-block in the computer cache memory during execution, and the second sub-block is located at a main memory address that is offset by at least one or a multiple of the cache size from the first ending address of the first sub-block to prevent cache conflict misses.

2. A method as recited in claim 1, further comprising the operation of placing a third data block within the main computer memory, the third data block including a third sub-block that will be frequently referenced, wherein the third data block is placed such that the third sub-block will be contiguous with the first sub-block and the second sub-block in the computer cache memory during execution.

3. A method as recited in claim 2, wherein the third data block is placed such that the third sub-block is located at a main memory address that is offset by a multiple of the cache size from an ending address of the second sub-block to prevent cache conflict misses.

4. A method as recited in claim 3, wherein the first data block, the second data block, and the third data block each is a data object.

5. A method as recited in claim 3, wherein the first data block, the second data block, and the third data block each is a function.

6. A computer program embodied on a computer readable medium for reducing computer cache conflict misses, comprising:
   a code, segment that places a first data block within a main computer memory, the first data block occupying a first contiguous portion of the main computer memory, wherein the first data block includes a first sub-block that will be frequently referenced, and wherein the first sub-block ends at a first ending address; and
   a code segment that places a second data block within the main computer memory, the second data block occupying a second contiguous portion of the main computer memory, the second data block including a second sub-block that will be frequently referenced, wherein the second data block is placed such that the second sub-block is located at a main memory address that is offset by at least one or a multiple of a cache size of the computer cache from the first ending address of the first sub-block to prevent cache conflict misses so that the second sub-block will be contiguous with the first sub-block in the computer cache during execution.

7. A computer program as recited in claim 6, further comprising a code segment that determines which sub-blocks of a data block will be frequently accessed.

8. A computer program as recited in claim 6, further comprising a code segment that determines the cache size.

9. A computer program as recited in claim 6, wherein the first data block is not split in main memory, and wherein the second data block is not split in main memory.

10. A computer program as recited in claim 6, further comprising a code segment that places a third data block within the main computer memory, the third data block including a third sub-block that will be frequently referenced, wherein the third data block is placed such that the third sub-block will be contiguous with the first sub-block and the second sub-block in the computer cache memory during execution.

11. A computer program as recited in claim 10, wherein the third data block is placed such that the third sub-block is located at a main memory address that is offset by a multiple of the cache size from an ending address of the second sub-block to prevent cache conflict misses.

12. A computer program as recited in claim 10, wherein the first data block, the second data block, and the third data block each is a data object.

13. A computer program as recited in claim 11, wherein the first data block, the second data block, and the third data block each is a function.

14. A method for reducing computer cache conflict misses, comprising the operations of:
    determining a cache size of a computer cache memory;
    placing a first data block within a main computer memory, the first data block occupying a contiguous portion of the main computer memory, wherein the first data block includes a first sub-block that will be frequently referenced, and wherein the first sub-block ends at a first ending address; and
    placing a second data block within the main computer memory, the second data block occupying a contiguous portion of the main computer memory, the second data block including a second sub-block that will be frequently referenced, wherein the second data block is placed such that the second sub-block is located at a main memory address that is offset by at least one or a multiple of the cache size from the first ending address of the first sub-block to prevent cache conflict misses so that the second sub-block will be contiguous with the first sub-block in the computer cache during execution.

15. A method as recited in claim 14, wherein each data block is a data object, and wherein each sub-block is a field.

16. A method as recited in claim 15, further comprising the operation of placing a third data object within the main computer memory, the third data object including a third field that will be frequently referenced, wherein the third data object is placed such that the third field is located at a main memory address that is offset by a multiple of the cache size from the ending address of the second sub-block to prevent cache conflict misses.

17. A method as recited in claim 14, wherein each data block is a function, and wherein each sub-block is a basic block.

18. A method as recited in claim 17, further comprising the operation of placing a third function within the main computer memory, the third function including a third basic block that will be frequently referenced, wherein the third function is placed such that the third basic block is located at a main memory address that is offset by a multiple of the cache size from the ending address of the second basic block to prevent cache conflict misses.

19. A method for reducing computer cache conflict misses, comprising the operations of:
   determining a cache size of a computer cache memory;
   placing a first data block within a main computer memory, without splitting the first data block, wherein the first data block includes a first sub-block that will be frequently referenced, and wherein the first sub-block ends at a first ending address; and
   placing a second data block within the main computer memory, without splitting the second data block, the second data block including a second sub-block that will be frequently referenced, wherein the second data block is placed such that the second sub-block will be contiguous with the first sub-block in the computer cache memory during execution, and the second sub-block is located at a main computer memory address that is offset by at least one or a multiple of the cache size from the first ending address of the first sub-block to prevent cache conflicting misses.

* * * * *